(12) United States Patent
Mori et al.

(10) Patent No.: US 7,998,608 B2
(45) Date of Patent: Aug. 16, 2011

(54) LITHIUM SECONDARY BATTERY

(75) Inventors: Tsutomu Mori, Nagoya (JP); Wataru Shionoya, Nagoya (JP); Shinji Ohtsubo, Nagoya (JP); Kenshin Kitou, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1463 days.

(21) Appl. No.: 11/230,282

(22) Filed: Sep. 19, 2005

(65) Prior Publication Data

US 2006/0063063 A1 Mar. 23, 2006

(30) Foreign Application Priority Data

Sep. 22, 2004 (JP) ................................ 2004-274799
Jun. 29, 2005 (JP) ................................ 2005-189263

(51) Int. Cl.
*H01M 2/12* (2006.01)
(52) U.S. Cl. ...................................................... 429/53
(58) Field of Classification Search ..................... 429/53, 429/61–66, 82, 94, 161, 163, 164, 208, 211
See application file for complete search history.

(56) References Cited

U.S. PATENT DOCUMENTS

| 6,020,084 | A  | * | 2/2000 | Romero et al. | 429/94 |
| 6,509,114 | B1 | * | 1/2003 | Nakai et al.  | 429/94 |
| 6,924,059 | B1 | * | 8/2005 | Kawakami et al. | 429/185 |
| 2002/0076606 | A1 | * | 6/2002 | Matsumoto | 429/94 |
| 2003/0148175 | A1 | * | 8/2003 | Iwanaga et al. | 429/130 |
| 2003/0198863 | A1 | * | 10/2003 | Murashige et al. | 429/53 |
| 2004/0247999 | A1 | * | 12/2004 | Shirane et al. | 429/161 |

FOREIGN PATENT DOCUMENTS

| JP | 06-163018 | 6/1994 |
| JP | 09-092249 | 4/1997 |
| JP | 09-161751 | 6/1997 |
| JP | 10-162801 | 6/1998 |
| JP | 2001-283894 | 10/2001 |
| JP | 2004-327066 | 11/2004 |
| JP | 2005-259468 | 9/2005 |

\* cited by examiner

*Primary Examiner* — Patrick Ryan
*Assistant Examiner* — Muhammad Siddiquee
(74) *Attorney, Agent, or Firm* — Burr & Brown

(57) ABSTRACT

A lithium secondary battery including: an inner electrode member having electrode plates (cathode plate and anode plate) of a metal foil as a constituting element, and being formed by winding or laminating electrode plates; and a battery case for housing the inner electrode member. A gas release channel capable of releasing a gas to the outside of the battery case is formed by deformation of the inner electrode member by a function of a raised inner pressure when the inner pressure of the battery case rises to a predetermined pressure or more due to the gas generated inside the inner electrode member. The lithium secondary battery can smoothly release the gas generated inside the inner electrode member without being retained therein before the gas reaches a pressure releasing mechanism; thus, it is superior in safety and has a high energy density.

13 Claims, 13 Drawing Sheets

US 7,998,608 B2

LITHIUM SECONDARY BATTERY

TECHNICAL FIELD

The present invention relates to a lithium secondary battery, more particularly to a lithium secondary battery which is superior in safety and which has a high energy density.

BACKGROUND ART

In recent years, miniaturization and lightening have acceleratively advanced in a notebook-size personal computer or a portable electronic device selectively having functions of a telephone, camera, GPS, radio, television and the like, and a lithium secondary battery is preferably used.

The lithium secondary battery is a secondary battery in which a lithium transition metal composite oxide is used in a (cathode) active substance of a cathode plate, a carbonaceous material is used in an (anode) active substance of an anode plate, and a nonaqueous electrolytic solution obtained by dissolving a lithium ion electrolyte in an organic solvent is used in an electrolytic solution, respectively. The battery has a characteristic that an energy density is large because an electric cell voltage is about 4 V and high. Since the battery is miniaturized and its voltage is raised owing to the characteristic as compared with a conventional secondary battery, the battery is not limited to the above-described application, the battery is also noted as a power supply for driving a motor of an electric car or a hybrid electric car that is positively and generally spreading as a low-emission car in the background of a recent environmental problem, and the application of the battery is enlarged more.

With the enlargement of the application, enhancement of safety is required for the lithium secondary battery. Since the lithium secondary battery having a high energy density and a large capacity has a large absolute value of accumulated energy, a risk in a case where the battery is improperly used is high. Therefore, it is necessary to secure sufficient safety at a handling or charging/discharging time.

According to the Battery Association of Japan, as an improper use test of a safety evaluation standard guideline of the lithium secondary battery, "nail sticking test" is specified in which a metal rod is driven into an electrode member inside the fully charged battery, and the cathode plate and the anode plate in the electrode member are internally short-circuited. It is determined that the safety should be secured without ignition, explosion or the like of the battery even in a case where an abnormal current rapidly flows. Moreover, to clear the nail sticking test, as shown in FIG. 8, assuming a case where heat is generated by the abnormal current, the electrolytic solution is evaporated, and a battery inner pressure rises, the lithium secondary battery 31 is provided with a pressure releasing mechanism 32 which allows the release of the battery inner pressure to an atmospheric air pressure (see, e.g., Patent Document 1).

Moreover, as shown in FIG. 9, a drop of battery performance is sometimes caused unless gas purging is sufficiently secured in a case where a gas is generated inside inner electrode members (electrode structures 42). To solve the problem, there is disclosed a lithium secondary battery 41 in which a plurality of collector-foil-side pores 43 are made in a cathode-side collector foil and an anode-side collector foil constituting the electrode structures 42, a plurality of core-side pores 45 are also made in a core 44 for taking up these collector foils, and the gas generated in the electrode structures 42 are released by the collector-foil-side pores 43 and the core-side pores 45 (see, e.g., Patent Document 2). It is to be noted that in FIG. 9, reference numeral 46 denotes a battery case.

[Patent Document 1] Japanese Patent Application Laid-Open No. 9-92249
[Patent Document 2] Japanese Patent Application Laid-Open No. 10-162801

DISCLOSURE OF THE INVENTION

However, in the lithium secondary battery described in Patent Document 1, there has been a problem that in a case where the electrolytic solution is evaporated and gasified owing to the heat generation by the abnormal current or the like, the gas is easily accumulated inside the battery before reaching the pressure releasing mechanism. Therefore, the gas cannot be sufficiently purged through the operated pressure releasing mechanism, and it sometimes becomes difficult to secure the safety of the battery.

Moreover, the lithium secondary battery described in Patent Document 2 has a problem that since the collector-foil-side pores are made in the cathode-side collector foil and the anode-side collector foil, the energy density of the inner electrode member drops, and the capacity of the battery is reduced. Such lithium secondary battery also has a problem that since the collector-foil-side pores and the core-side pores need to be positioned to manufacture the battery, manufacturing steps become laborious, and costs increase.

The present invention has been developed in view of such problems, and there is provided a lithium secondary battery in which a gas generated inside an inner electrode member is prevented from being accumulated inside the battery before reaching a pressure releasing mechanism, and can be smoothly released and which is superior in safety and which has a high energy density.

That is, according to the present invention, there is provided the following lithium secondary battery.

[1] A lithium secondary battery comprising:
an inner electrode member having wound or laminated electrode plates of a metal foil; and
a battery case for housing the inner electrode member,
wherein when an inner pressure of the battery case rises to a predetermined pressure or more by a gas generated inside the inner electrode member, a gas release channel which allows the release of the gas to the outside of the battery case is formed by deformation of the inner electrode member by a raised inner pressure.

[2] The lithium secondary battery according to the above [1], wherein at least a part of the gas release channel is formed inside the inner electrode member in a direction vertical to the surface of the inner electrode member onto which the electrode plate is wound or laminated.

[3] The lithium secondary battery according to the above [2], wherein the deformation indicates that a pre-designed predetermined portion of the metal foil is broken to form a hole.

[4] The lithium secondary battery according to any one of the above [1] to [3], wherein the inner electrode member further has a core member onto which the electrode plate is wound or laminated.

[5] The lithium secondary battery according to the above [4], wherein the core member is shaped to have a predetermined inner space and one or more through-holes formed to communicate with the inner space, and the metal foil in the vicinity of the through-hole is broken to form a hole, and the gas release channel is formed which allows the release of the gas to the outside of the battery case through the hole, the through-hole, and the inner space by the function of the raised inner pressure when the inner pressure rises to the predetermined pressure or more.

[6] The lithium secondary battery according to the above [4], wherein the core member is provided with one or more groove portions which extend to at least one end portion of the core member, and the metal foil in the vicinity of the groove portion is broken to form a hole, and the gas release channel is formed which allows the release of the gas to the outside of the battery case through the hole and the groove portion by the function of the raised inner pressure in the case where the inner pressure rises to the predetermined or more pressure.

[7] The lithium secondary battery according to the above [4], wherein the core member is provided with two or more core member elements having hollow portions and disposed in such a manner that gap portions having predetermined intervals are formed between the respective core member elements and the hollow portions communicate with each other, and the metal foil in the vicinity of the gap portion is broken to form a hole, and the gas release channel is formed which allows the release of the gas to the outside of the battery case through the hole, the gap portion, and the hollow portions by the function of the raised inner pressure in the case where the inner pressure rises to the predetermined or more pressure.

[8] The lithium secondary battery according to the above [3], further comprising: a first exterior member which is disposed between the inner electrode member and the battery case and which has a predetermined inner space and which is provided with one or more through-holes which communicate with the inner space, wherein the metal foil in the vicinity of the through-hole is broken to form a hole, and the gas release channel is formed which allows the release of the gas to the outside of the battery case through the hole, the through-hole, and the inner space by the function of the raised inner pressure when the inner pressure rises to the predetermined pressure or more.

[9] The lithium secondary battery according to any one of the above [3] to [8], wherein a strength (F1) of the battery case and a strength (F2) of the portion of the metal foil material in which the hole is formed satisfy a relation of F2<F1.

[10] The lithium secondary battery according to the above [1], wherein the inner electrode member is expanded and deformed in a thickness direction of the electrode plate, a space portion is formed between the electrode plates disposed adjacent to each other, and the gas release channel is formed which allows the release of the gas to the outside of the battery case through the space portion by the function of the raised inner pressure when the inner pressure rises to the predetermined pressure or more.

[11] The lithium secondary battery according to the above [10], further comprising: a second exterior member which is disposed between the inner electrode member and the battery case and which is deformable at a predetermined pressure, wherein the second exterior member is deformed, and the inner electrode member is expanded and deformed in a thickness direction of the electrode plates by the function of the raised inner pressure when the inner pressure rises to the predetermined pressure or more.

[12] The lithium secondary battery according to any one of the above [1] to [11], wherein the battery case comprises a pressure releasing mechanism, and an end of the gas release channel communicates with the pressure releasing mechanism.

[13] The lithium secondary battery according to any one of the above [1] to [12], wherein a shape of the core member is a pipe-shape, and a whole shape is a cylindrical.

[14] The lithium secondary battery according to any one of the above [1] to [12], wherein a shape of the core member is a hollow plate-shape, and a whole shape of the battery is a prismatic.

The lithium secondary battery of the present invention is capable of smoothly releasing the pressure of the gas generated inside the inner electrode member without retaining the gas before the gas reaches the pressure releasing mechanism, and is remarkably superior in safety. Since a substantial surface area of the metal foil material constituting the cathode plate and the anode plate is effectively utilized in the lithium secondary battery of the present invention, the safety is enhanced while maintaining the energy density to be high.

BRIEF DESCRIPTION OF THE DRAWINGS

FIG. 2 An explanatory view schematically showing one example of a core member for use in the lithium secondary battery shown in FIG. 1.

FIG. 9 An explanatory view showing another embodiment of the conventional lithium secondary battery.

Figure 1:
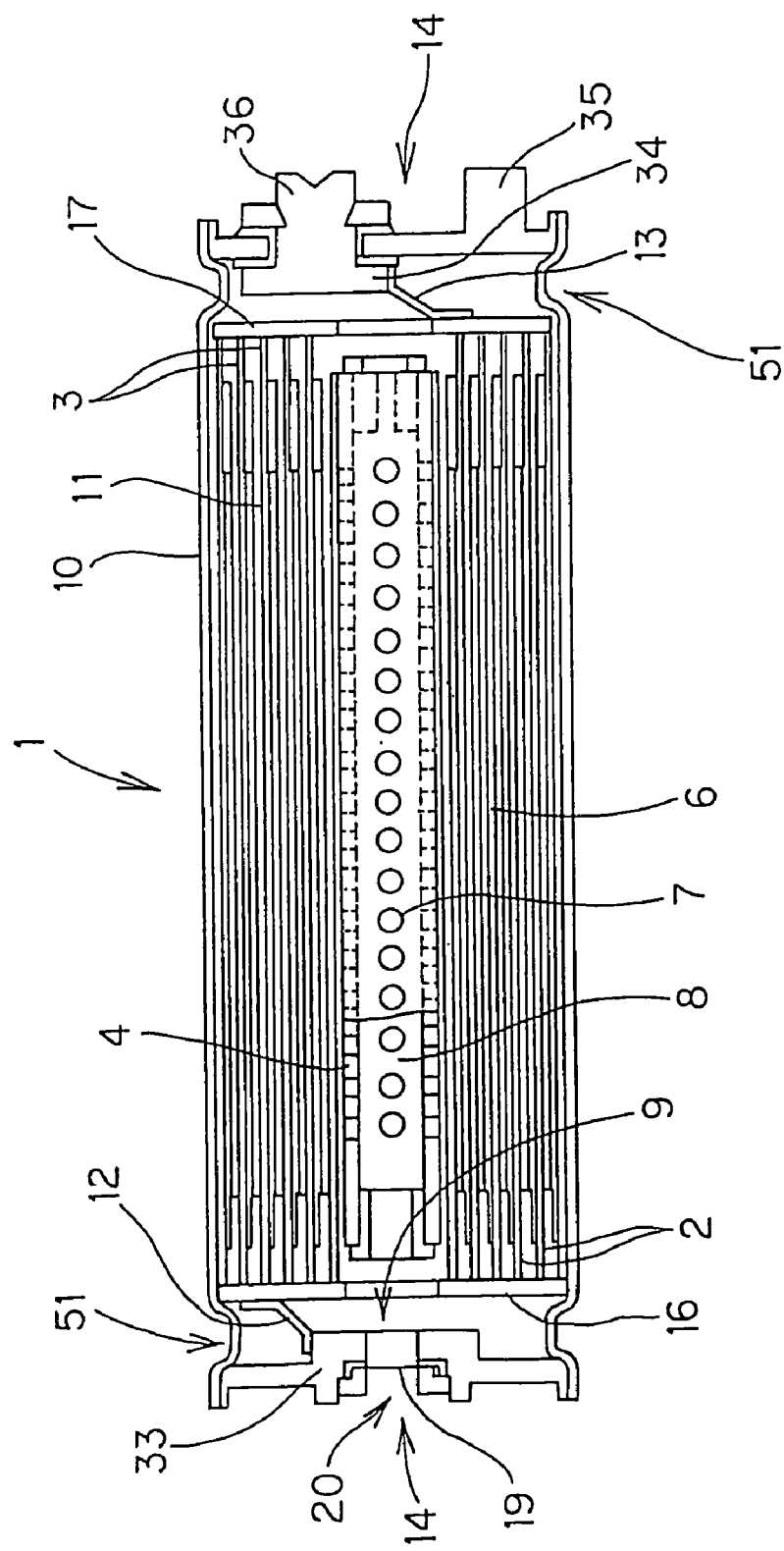
FIG. 1 A sectional view schematically showing one embodiment of a lithium secondary battery of the present invention.

DESCRIPTION OF REFERENCE NUMBERS 1, 21, 31, 41, 93, 103, 123: lithium secondary battery, 2, 26: cathode plate, 3, 27: anode plate, 4, 24, 38, 44, 61, 71, 81: core member, 6, 25, 37, 74, 85, 96, 106, 110, 126: inner electrode member, 7, 28, 91, 101: through-hole, 8, 29, 62, 90, 100: inner space, 9: pressure release hole, 10, 94, 104, 124: battery case, 11: separator, 12, 13: electrode lead wire, 14: electrode lid, 16: cathode collector member, 17: anode collector member, 19: metal foil, 20: pressure release valve, 32: pressure releasing mechanism, 33: cathode inner terminal, 34: anode inner terminal, 35: cathode outer terminal, 36: anode outer terminal, 42: electrode structures, 43: collector-foil-side pores, 45: core-side pores, 51: necked portion, 60: slit (notched portion), 70: groove portion, 72: end portion, 73, 84, 95, 105, 111, 125: electrode plate, 80: core member element, 82: gap portion, 83: hollow portion, 92: first exterior member, 102: first exterior member, 112, 121: space portion, 122: second exterior member, F1, F2: strength

BEST MODE FOR CARRYING OUT THE INVENTION

The best mode for carrying out the present invention will be described hereinafter, but it should be understood that the present invention is not limited to the following embodiment, and the scope of the present invention includes appropriate modifications, improvements and the like of the following embodiments based on ordinary knowledge of a person skilled in the art without departing from the scope of the present invention.

In one embodiment of the present invention, a lithium secondary battery comprises: an inner electrode member having electrode plates of a metal foil as a constituting element, and being constituted by winding or laminating the electrode plates; and a battery case for housing the inner electrode member. In the lithium secondary battery of the present embodiment, a gas release channel capable of releasing a gas to the outside of the battery case is formed involving deformation of the inner electrode member by a function of a raised inner pressure when the inner pressure of the battery case rises to a predetermined pressure or more by means of the gas generated inside the inner electrode member which is the constituting element. Therefore, in the lithium secondary battery of the present embodiment, the pressure inside the battery, especially inside the inner electrode member does not easily excessively rise even at an abnormal time, and breakage or ignition by short-circuit of the battery case can be effectively prevented.

Moreover, the lithium secondary battery of the present embodiment does not have a configuration in which pores are made beforehand in the electrode plate (metal foil material), and the gas release channel is prepared beforehand as in the lithium secondary battery described in, for example, Patent Document 2. That is, the battery is constituted in such a manner that the inner pressure which rises accompanying generation of abnormality is utilized, and the gas release channel is formed by the function of the raised inner pressure. Therefore, since it is not necessary to perform beforehand such working as to reduce a surface area of the electrode plate (metal foil material), for example, the making of the pores, the battery has remarkably high energy density and capacity.

Next, details of the gas release channel formed involving the deformation of the inner electrode member will be described in accordance with typical examples. Examples of a configuration in which at least a part of the gas release channel is formed include: a configuration in which the part of the gas release channel is formed inside the inner electrode member in a direction vertical to the surface of the inner electrode member onto which the electrode plate is wound or laminated. Moreover, examples of the deformation of the inner electrode member caused in this case include: (1) a pre-designed predetermined portion of the metal foil material is broken to form a hole; and (2) the inner electrode member is expanded and deformed in the thickness direction of the electrode plate.

It is to be noted that in the lithium secondary battery of the present embodiment, the inner electrode member further has a core member onto which the electrode plate is wound or laminated, and this is preferable because it is possible to facilitate the designing of the predetermined portion of the metal foil material in which the hole is formed. More details of the lithium secondary battery according to the present invention will be described hereinafter specifically with reference to the drawings.

Figure 2A:
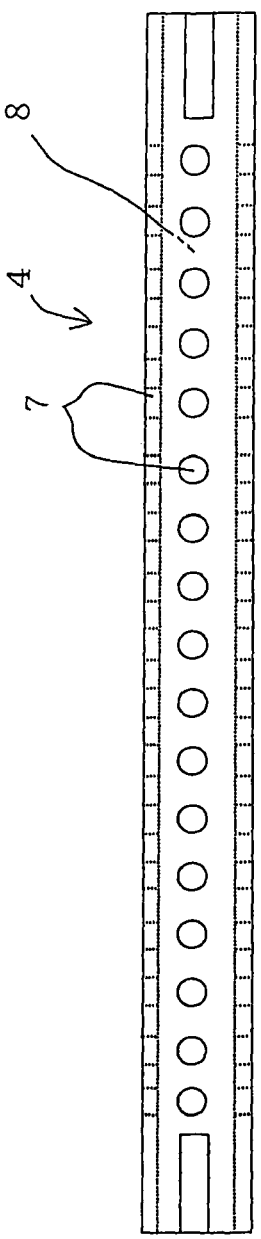
FIG. 2(a) is a front view viewed from a direction vertical to a central axis.
Figure 2C:
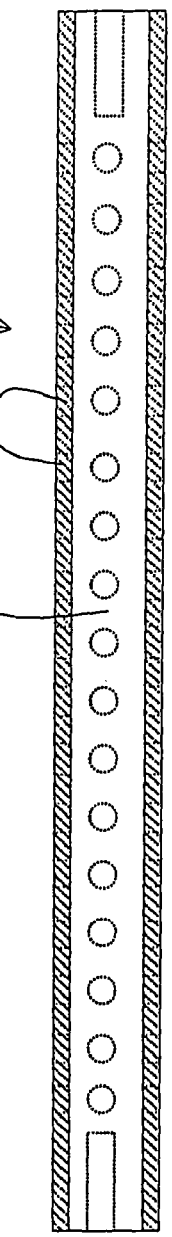
FIG. 2(c) is a sectional view of FIG. 2(a)
Figure 2B:
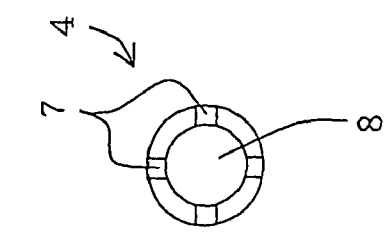
FIG. 2(b) is a side view viewed from a direction parallel to the central axis.

FIG. 1 is a sectional view schematically showing one embodiment of the lithium secondary battery of the present invention. FIG. 2 is an explanatory view schematically showing one example of a core member for use in the lithium secondary battery shown in FIG. 1, FIG. 2(a) is a front view viewed from a direction vertical to a central axis, FIG. 2(b) is a side view viewed from a direction parallel to the central axis, and FIG. 2(c) is a sectional view of FIG. 2(a). As shown in FIGS. 1 and 2(a) to 2(c), a lithium secondary battery 1 of the present embodiment comprises: an inner electrode member 6 having electrode plates (cathode plates 2, anode plates 3) including metal foil materials as constituting elements and constituted by winding or laminating the electrode plates; and a battery case 10 containing this inner electrode member 6. Here, in FIG. 1, reference numeral 16 denotes a cathode collector member, 17 denotes an anode collector member, 33 denotes a cathode inner terminal, 34 denotes an anode inner terminal, 35 denotes a cathode outer terminal, and 36 denotes an anode outer terminal. It is to be noted that the inner electrode member 6 shown in FIG. 1 is a wound type inner electrode member constituted by winding the cathode plates 2 and the anode plates 3 around a core member 4.

The core member 4 is shaped in such a manner as to have an inner space 8 and at least one through-hole 7 which communicates with the inner space 8. It is to be noted that at least one end portion of this inner space 8 communicates with a pressure releasing mechanism capable of releasing a gas generated inside the inner electrode member 6 to the outside of the battery case 10. Specifically, the end portion of the inner space 8 communicates with a pressure release hole 9 (pressure release valve 20). In the lithium secondary battery 1 of the present embodiment, first a portion in the vicinity of the through-hole 7 of the metal foil material is broken to form a hole (not shown) by a function of a raised inner pressure when the inner pressure of the battery case 10 rises to a predetermined pressure or more by a gas generated inside the inner electrode member 6. Accordingly, a gas release channel is formed which is capable of releasing the generated gas to the outside of the battery case 10 through the hole, the through-hole 7, and the inner space 8. It is to be noted that when the metal foil materials as the constituting elements of the cathode plates 2 and the anode plates 3 are broken to form holes, holes are simultaneously formed in separators 11 disposed in such a manner as to prevent the cathode plates 2 from being brought into contact with the anode plates 3.

In a conventional lithium secondary battery, a gap between the electrode plates disposed adjacent to each other is utilized as a release channel of a gas generated by an electrolytic solution evaporated by heat generation attributable to an abnormal current. Therefore, the gas is not satisfactorily released from the gap between the adjacent electrode plates depending on an inner state of the lithium secondary battery or an amount of the generated gas in some case.

On the other hand, the lithium secondary battery 1 of the present embodiment is constituted in such a manner that the predetermined portion of the metal foil material is broken to form the hole, and there is formed the gas release channel including this hole, the through-hole 7, and the inner space 8 of the core member 4 in the case where the inner pressure of the battery case 10 rises to the predetermined or more pressure by the gas generated inside the inner electrode member 6. Therefore, when the gas is not satisfactorily released from the gap between the adjacent electrode plates (cathode plates 2, anode plates 3), and the inner pressure rises, the above-described gas release channel is formed, and the gas is released. Therefore, in the lithium secondary battery 1 of the present embodiment, the pressure inside the battery, especially inside the inner electrode member 6 does not easily excessively rise even at an abnormal time, and breakage or ignition due to short-circuit of the battery case 10 can be effectively prevented.

Moreover, in the lithium secondary battery 1 of the present embodiment, holes for pressure release do not have to be made beforehand in the cathode plates 2 and the anode plates 3 which are constituting members. Therefore, in the lithium secondary battery 1 of the present embodiment, the surface area of the metal foil material is effectively utilized at a use time in a usual state, and the energy density is remarkably high.

Figure 10:
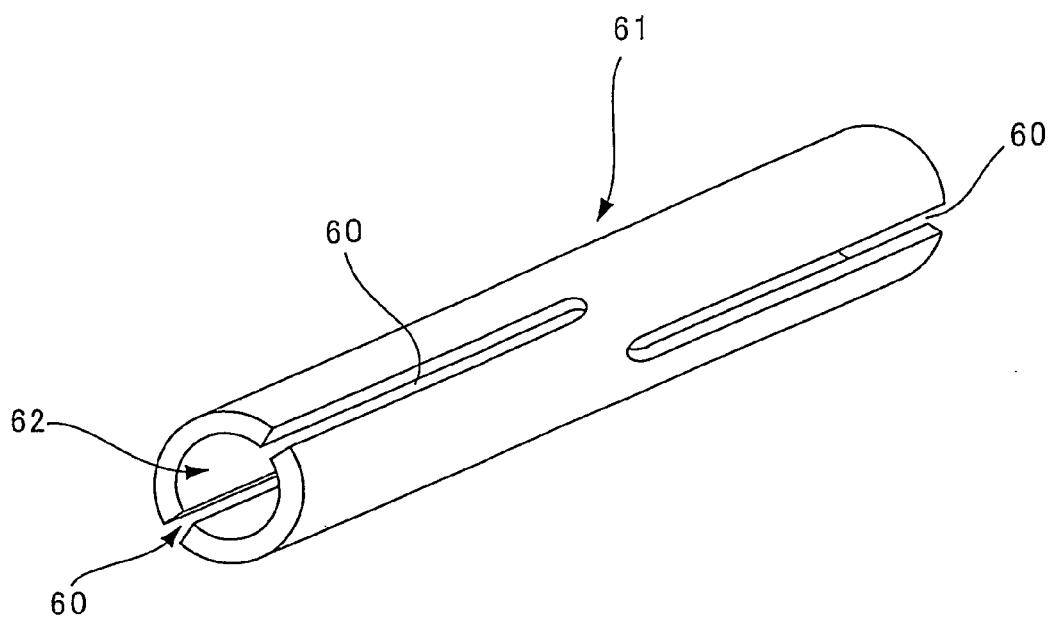
FIG. 10 A perspective view showing still another example of the core member for use in the lithium secondary battery of the present invention.

In the core member 4 for use in the lithium secondary battery 1 shown in FIG. 1, 17 through-holes 7 are formed in an axial direction of the core member, and four through-holes 7 are formed in a peripheral direction, but in the lithium secondary battery according to the present invention, there is not any special restriction on the number, shape, size and the like of the through-holes 7 formed in the core member 4 as long as an excessive rise of the inner pressure is suppressed, and the gas can be effectively released to the outside of the battery. Therefore, the number and the like of the through-holes 7 formed in the core member 4 may be appropriately set in accordance with a dimension of the whole battery, materials or dimensions (thicknesses) of the cathode plate 2, the anode plate 3, and the separator 11, a pressure at which the release of the gas is initiated and the like. A core member 61 having a shape shown in FIG. 10 can be used. The core member 61 shown in FIG. 10 has an inner space 62, and is provided with one or more slits (notched portions) 60 which communicate with this inner space 62. That is, the "through-hole" mentioned in the present specification conceptually includes the slit (notched portion) 60 shown in FIG. 10. It is to be noted that either of the through-hole and the slit (notched portion) may be formed in the core member.

Moreover, FIG. 1 illustrates the core member 4 which is cylindrical, and has a columnar whole shape in such a manner as to guide the gas to the pressure release hole 9 via the through-holes 7, but the core member may be formed using a material provided with a plurality of pores, such as a porous material. When the core member is formed using such porous material or the like, the core member does not have to be formed to be cylindrical, and the generated gas can be guided into the pressure release hole 9 via the pores in the porous material. It is to be noted that a metal foil 19 and the pressure release valve 20 are disposed in the pressure release hole 9, and the gas is released from this pressure release valve 20 to thereby release the pressure.

Figure 11A:
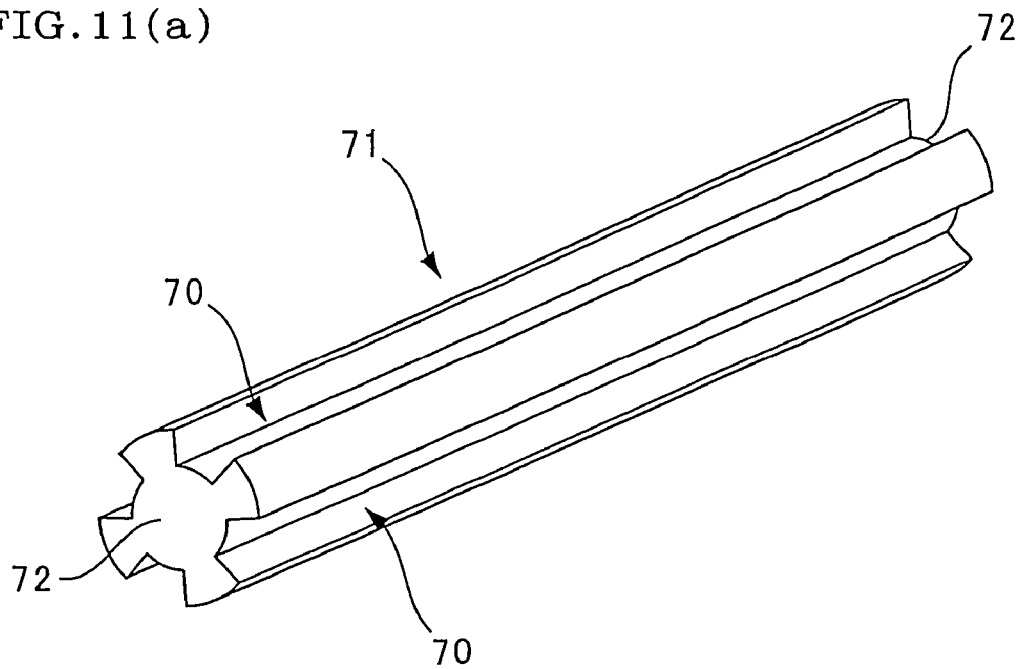
FIG. 11(a) A perspective view showing a further example of the core member for use in the lithium secondary battery of the present invention.
Figure 11B:
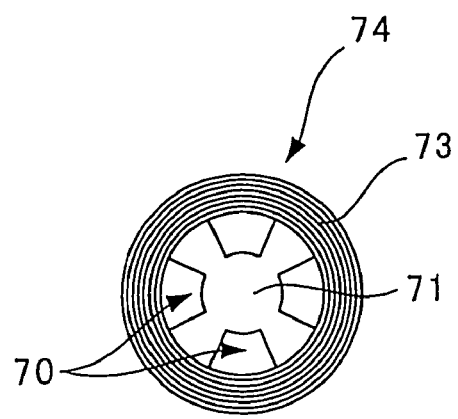
FIG. 11(b) A partially sectional view showing a further example of an inner electrode member for use in the lithium secondary battery of the present invention.

FIG. 11(a) is a perspective view showing still another example of the core member for use in the lithium secondary battery of the present invention. In the lithium secondary battery according to the present invention, as shown in FIG. 11(a), an inner electrode member 74 (see FIG. 11(b)) is preferably constituted using a core member 71 in which one or more groove portions 70 are formed up to at least one end portion 72. When the inner pressure of the lithium secondary battery according to the present invention, which comprises the inner electrode member 74 shaped as shown in FIG. 11(b), rises to a predetermined pressure or more, a portion of the metal foil constituting an electrode plate 73 is broken in the vicinity of the groove portion 70 to form a hole (not shown). Accordingly, a gas release channel is formed which allows the release of the generated gas to the outside of the battery case through the holes and the groove portions 70, and an effect similar to that of the lithium secondary battery 1 shown in FIG. 1 can be obtained.

Figure 12A:
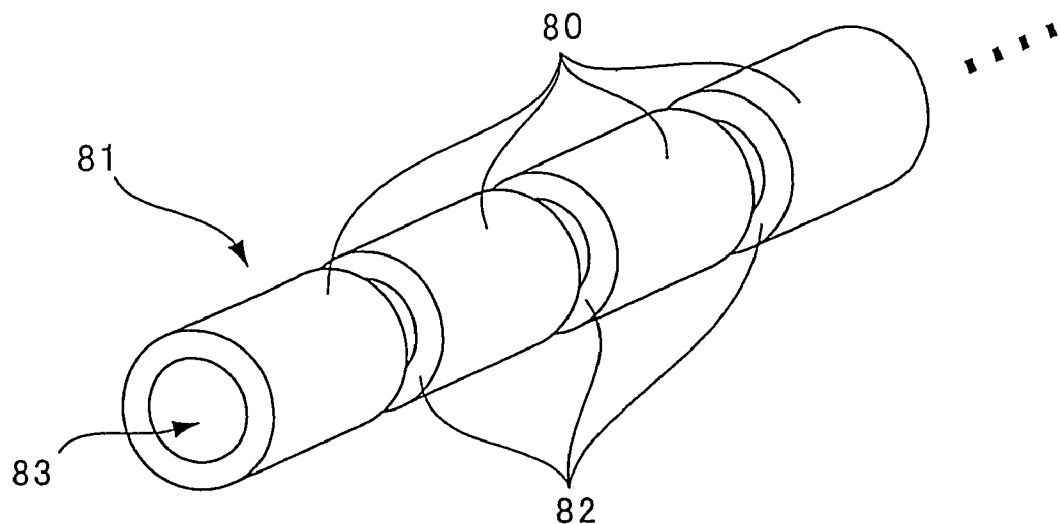
FIG. 12(a) A perspective view showing a further example of the core member for use in the lithium secondary battery of the present invention.
Figure 12B:
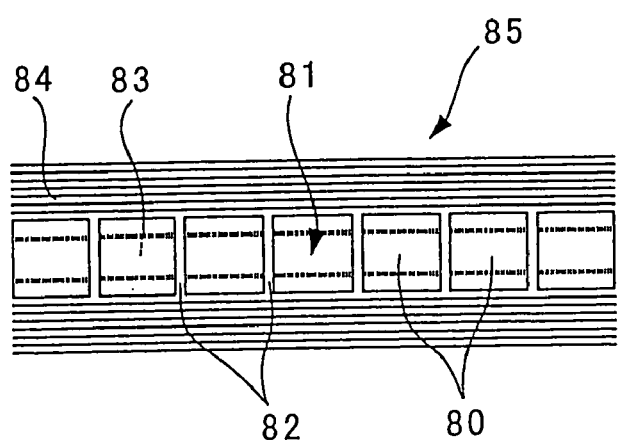
FIG. 12(b) A partially sectional view showing a further example of the inner electrode member for use in the lithium secondary battery of the present invention.

FIG. 12(a) is a perspective view showing still another example of the core member for use in the lithium secondary battery of the present invention. In the lithium secondary battery according to the present invention, as shown in FIG. 12(a), gap portions 82 having predetermined intervals are formed between two or more core member elements 80 having hollow portions 83, and an inner electrode member 85 (see FIG. 12(b)) is preferably constituted using a core member 81 in which the hollow portions 83 are disposed in such a manner as to communicate with one another. In a case where the inner pressure of the lithium secondary battery according to the present invention, which comprises the inner electrode member 85 shaped as shown in FIG. 12(b), rises to a predetermined pressure or more, portions of the metal foil constituting an electrode plate 84 are broken in the vicinity of the gap portions 82 to form holes (not shown). Accordingly, a gas release channel is formed which allows the release of the generated gas to the outside of the battery case through the holes, the gap portions 82, and the hollow portions 83, and an effect similar to that of the lithium secondary battery 1 shown in FIG. 1 can be obtained.

Figure 13:
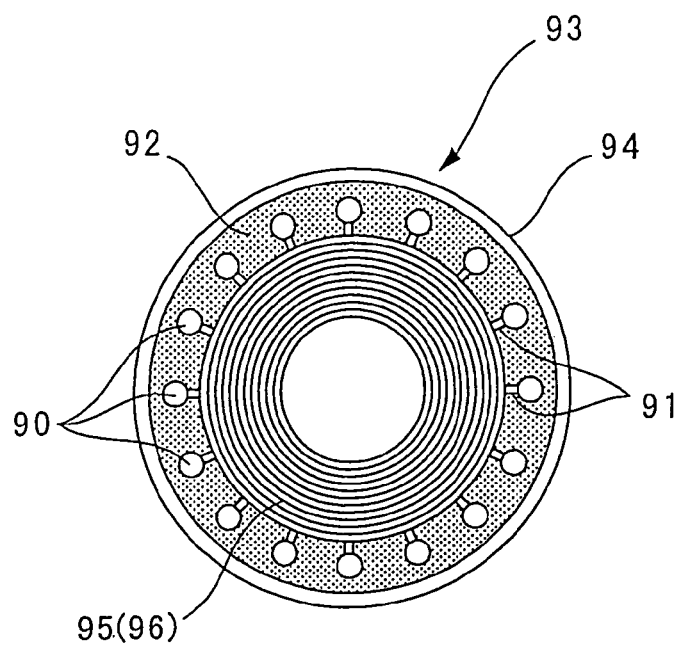
FIG. 13 A sectional view schematically showing still another embodiment of the lithium secondary battery of the present invention.

FIG. 13 is a sectional view schematically showing still another embodiment of the lithium secondary battery of the present invention, and shows the battery whose whole shape is columnar. A lithium secondary battery 93 of the present embodiment has inner spaces 90 between an inner electrode member 96 and a battery case 94, and further comprises a first exterior member 92 provided with one or more through-holes 91 which communicate with this inner spaces 90. It is to be noted that in the lithium secondary battery 93 of the present embodiment, a core member is not an indispensable constituting element. In a case where the inner pressure of the lithium secondary battery 93 according to the present invention rises to a predetermined pressure or more, portions of a metal foil material constituting an electrode plate 95 are broken in the vicinity of the through-holes 91 to form holes (not shown). Accordingly, a gas release channel is formed which allows the release of the generated gas to the outside of the battery case through the holes, the through-holes 91, and the inner spaces 90, and an effect similar to that of the lithium secondary battery 1 shown in FIG. 1 can be obtained.

Figure 14:
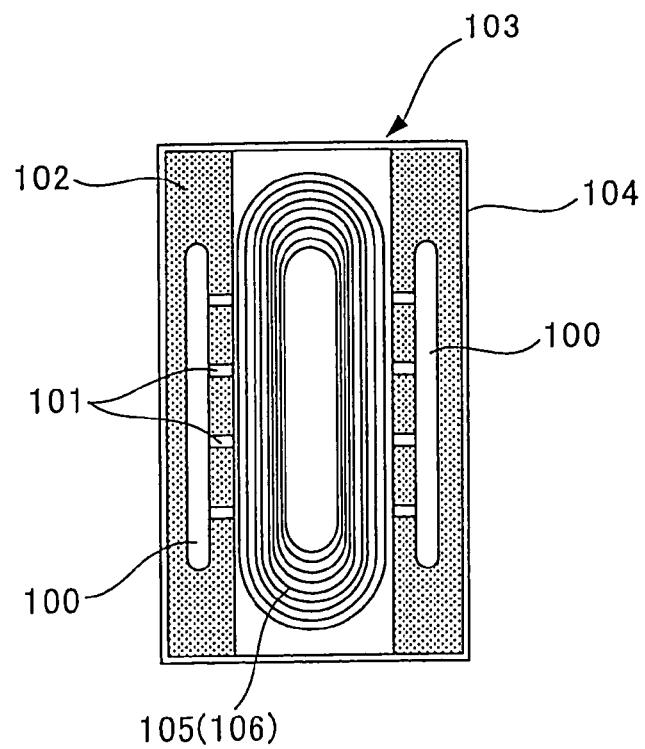
FIG. 14 A sectional view schematically showing a further embodiment of the lithium secondary battery of the present invention.

Moreover, FIG. 14 is a sectional view schematically showing still another embodiment of the lithium secondary battery of the present invention, and shows the battery whose whole shape is prismatic. A lithium secondary battery 103 of the present embodiment has an inner space 100 between an inner electrode member 106 and a battery case 104, and further comprises a first exterior member 102 provided with one or more through-holes 101 which communicate with this inner space 100. It is to be noted that in the lithium secondary battery 103 of the present embodiment, a core member is not an indispensable element. In a case where the inner pressure of the lithium secondary battery 103 of the present embodiment rises to a predetermined pressure or more, portions in the vicinity of the through-holes 101 are broken to form holes (not shown) in a metal foil material constituting an electrode plate 105. Accordingly, a gas release channel is formed which allows the release of the generated gas to the outside of the battery case through the holes, the through-holes 101, and the inner space 100, and an effect similar to that of the lithium secondary battery 1 shown in FIG. 1 can be obtained.

Figure 3:
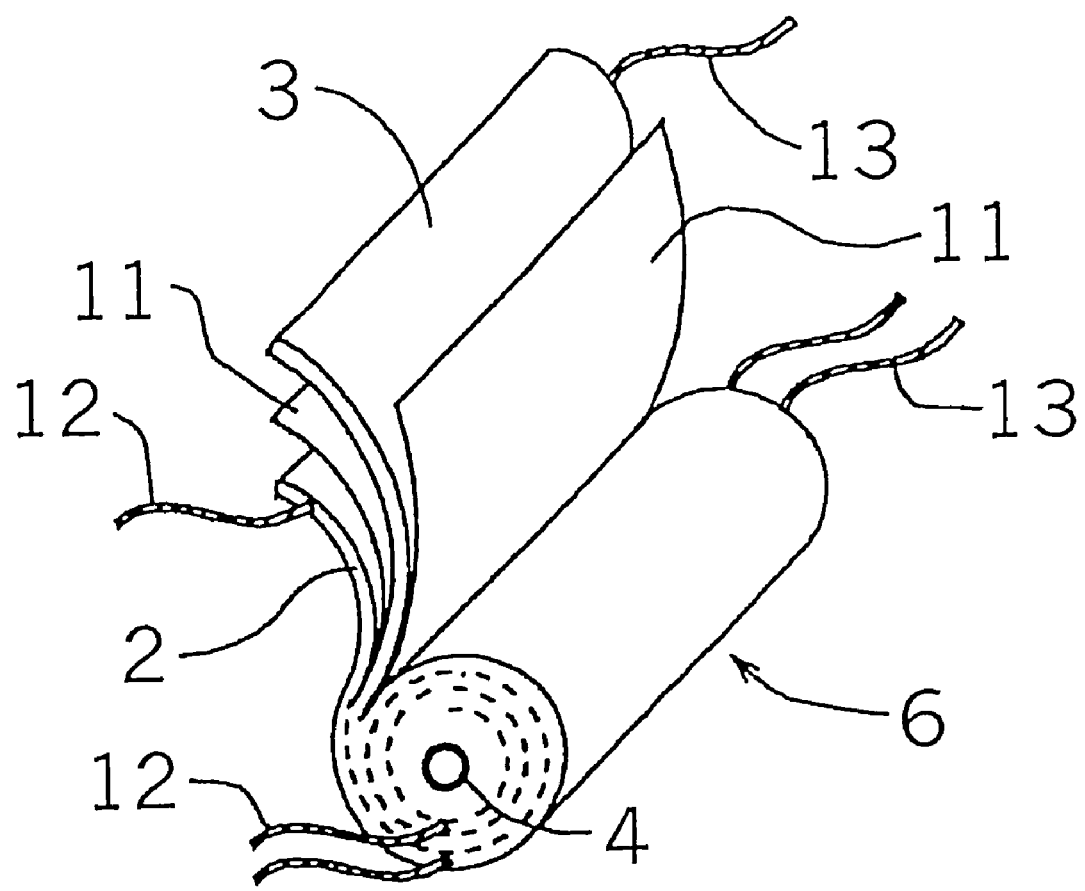
FIG. 3 A perspective view showing one example of an inner electrode member for use in the lithium secondary battery of the present invention.

FIG. 3 is a perspective view showing one example of an inner electrode member for use in the lithium secondary battery of the present invention. This inner electrode member 6 is a wound type inner electrode member, and constituted by winding a cathode plate 2 and an anode plate 3 around an outer periphery of a core member 4. A separator 11 is disposed between the cathode plate 2 and the anode plate 3. Therefore, the cathode plate 2 does not directly contact the anode plate 3. Electrode lead wires 12, 13 for performing electric connection are attached to the cathode plate 2 and the anode plate 3. At least one of each of the electrode lead wires 12, 13 may be attached, but a plurality of electrode lead wires 12, 13 may be attached to reduce a current collection resistance.

The cathode plate 2 is constituted of a metal foil material prepared by coating opposite surfaces of a collector substrate with a cathode active substance. As the collector substrate, there is used a metal foil such as an aluminum foil or a titanium foil having a satisfactory corrosion resistance against a cathode electrochemical reaction. It is to be noted that as the collector substrate, a mesh (net) of a metal, a punching metal or the like may be used. As the cathode active substance, a lithium transition metal composite oxide is usable. It is to be noted that micro carbon powder such as acetylene black is preferably added as an auxiliary conductive agent to the lithium transition metal composite oxide.

It is to be noted that as the lithium transition metal composite oxide, in addition to lithium manganese ($LiMnO_4$), there may be used lithium nickel oxide ($LiNiO_2$), lithium cobalt oxide ($LiCoO_2$), a manganese cobalt nickel composite cathode material ($LiMn_{1/3}Co_{1/3}Ni_{1/3}O_2$) or the like that has a thermal stability lower than that of lithium manganese oxide ($LiMnO_4$). In the lithium secondary battery according to the present invention, not only in a case where lithium manganese ($LiMnO_4$) having a comparatively satisfactory thermal stability is used as the cathode active substance but also in a case where the above-described lithium transition metal composite oxide having a lower thermal stability is used, disadvantages such as breakage and ignition of the battery case are not remarkably easily caused, and superior safety is secured.

The coating with the cathode active substance is performed by coating the collector substrate with a slurry or a paste prepared by adding a solvent, a bonding agent or the like to a cathode active substance powder by use of a roll coater process or the like, and drying the substrate. Thereafter, if necessary, a pressing treatment or the like is performed.

The anode plate 3 can be prepared in the same manner as in the cathode plate 2. As the metal foil material constituting the anode plate 3, there is preferably used a metal foil such as a copper foil or a nickel foil having a satisfactory corrosion resistance against an anode electrochemical reaction as the collector substrate. As an anode active substance, there is used an amorphous carbonaceous material such as soft carbon or hard carbon, or highly graphitized carbonaceous powder such as artificial graphite or natural graphite.

The separator 11 is made of porous-polymer, cellulose or the like. More typically, there is preferably used a three-layer structure in which a polyethylene film (PE film) having micro pores and permeable to lithium ions is sandwiched between porous polypropylene films (PP films) permeable to the lithium ions. The separator structured in this manner has a safety mechanism in a case where a temperature of the inner electrode member rises, the PE film softens at about 130° C., the micro pores collapse, and movement of the lithium ions, that is, a battery reaction is inhibited. Since this PE film is sandwiched between the PP films having a higher softening temperature, the PP films retain shapes to prevent the cathode plate 2 from being brought into contact with the anode plate 3 and prevent short-circuit therebetween even in a case where the PE film softens. It is possible to securely inhibit the battery reaction and secure the safety.

The electrode lead wires 12, 13 are attached to portions of the cathode plate 2 and anode plate 3 in which the collector substrate that is not coated with an electrode active substance is exposed at a winding operation time for the cathode plate 2, the anode plate 3, and the separator 11. As the electrode lead wires 12, 13, there are preferably used foil-like wires made of the same materials as those of the collector substrates of the cathode plate 2 and the anode plate 3, respectively. The electrode lead wires 12, 13 can be attached to the cathode plate 2 and the anode plate 3 by ultrasonic welding, spot welding or the like.

As a solvent for preparing a nonaqueous electrolytic solution, there is preferably usable: carbonic acid ester such as ethylene carbonate (EC), diethyl carbonate (DEC), dimethyl carbonate (DMC), or propylene carbonate (PC); or a single solvent or a mixed solvent of γ-butyrolactone, tetrahydrofuran, acetonitrile or the like. Especially from viewpoints of conductivity, high-temperature stability and the like of the electrolytic solution, a mixed solvent of cyclic carbonate and chain carbonate is preferably used.

Examples of an electrolyte for preparing the nonaqueous electrolytic solution include: lithium complex fluorine compounds such as lithium phosphate hexafluoride ($LiPF_6$) and lithium fluoroborate ($LiBF_4$); and lithium halide such as lithium perchlorate ($LiClO_4$). One type or two or more types of them can be dissolved in the above-described organic solvent (mixed solvent) to thereby obtain the nonaqueous electrolytic solution. As the electrolyte, $LiPF_6$ is especially preferably used. This is because oxidation decomposition does not easily occur, and reliability is high.

Moreover, as shown in FIG. 1, the pressure release hole 9 as the pressure releasing mechanism for use in the lithium secondary battery 1 of the present embodiment is formed in a position corresponding to a central portion of an electrode lid 14 in one end surface of the lithium secondary battery 1. The core member 4 is disposed in central portion of the lithium secondary battery 1. The pressure release hole 9 has such a structure that is integrated with an outer terminal and does not hinder pressure release. Therefore, the pressure releasing mechanism indicates satisfactory pressure release operability although it has a simple constitution. It is to be noted that the pressure releasing mechanism for use in the lithium secondary battery according to the present invention is not limited to the mechanism having the pressure release hole 9 shown in FIG. 1. That is, any conventional known pressure releasing mechanism may be preferably adopted as long as the gas generated inside the battery can be satisfactorily released.

It is to be noted that, as shown in FIG. 1, in the lithium secondary battery 1 of the present embodiment, necked portions 51 are formed in the electrode lid 14 and/or a battery case 10 portion right close to an outer edge portion of the electrode lid 14 provided with the pressure release hole 9, and this is preferable because the electrode lid 14 is securely positioned and fixed. To prepare the lithium secondary battery 1 having the pressure releasing mechanism, first the necked portion 51 is formed in an opening end portion of the battery case 10. Subsequently, a plate-like member provided with a hole in a portion corresponding to the pressure release hole 9 is welded and fixed to the opening end portion of the battery case 10 in which the necked portion 51 is formed. Thereafter, a pressure release hole unit constituted integrally with the pressure release hole 9 can be fitted into the plate-like member to prepare the lithium secondary battery 1 having the pressure releasing mechanism. When the necked portion 51 is formed in the opening end portion of the battery case 10 in this manner, a fitting stress generated in fitting the pressure release hole unit into the plate-like member can be scattered in not only the portion welded to the battery case 10 but also the necked portion 51 of the battery case 10. Therefore, safety in production is enhanced, and yield is also enhanced.

To assemble the lithium secondary battery 1 shown in FIG. 1, the inner electrode member 6 is inserted into the battery case 10 to hold the member in a stable position while securing conduction between a terminal for drawing a current to the outside and the electrode lead wires 12, 13, and the battery is thereafter impregnated with the nonaqueous electrolytic solution. Subsequently, when the battery case 10 is sealed, the lithium secondary battery 1 can be obtained. An oxidizing agent may be preferably inserted into the battery case 10. When the oxidizing agent for use is a gas such as air, oxygen, or ozone, the battery may be assembled, and impregnated with the nonaqueous electrolytic solution in an atmosphere including the gas.

It is to be noted that in the lithium secondary battery 1 of the present embodiment, instead of attaching the electrode lead wires 12, 13 to the cathode plate 2 and the anode plate 3 constituting the wound type inner electrode member 6, cathode collector members may be welded and connected to a tip of a metal foil material of the cathode plate 2, and an anode collector member may be welded and connected to a tip of a metal foil material of the anode plate 3, respectively, to form a so-called tab-less structure type lithium secondary battery.

Figure 4:
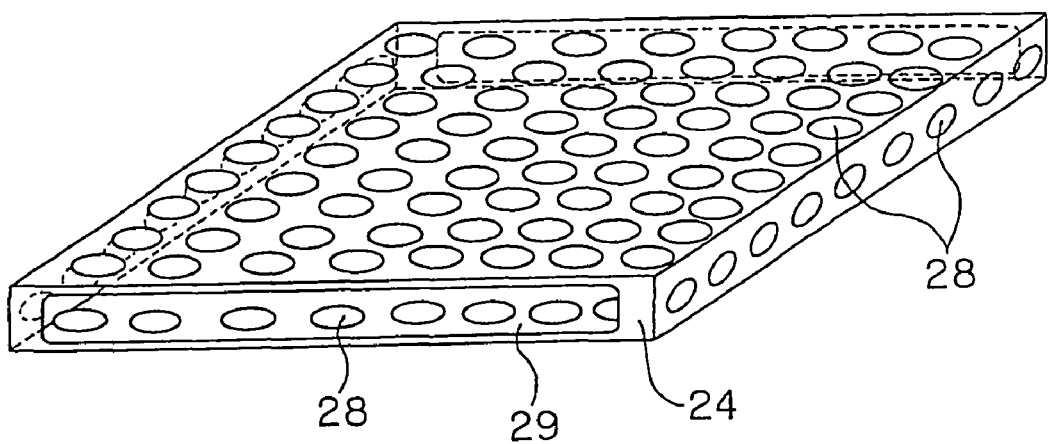
FIG. 4 A perspective view showing another example of the core member for use in the lithium secondary battery of the present invention.
Figure 5:
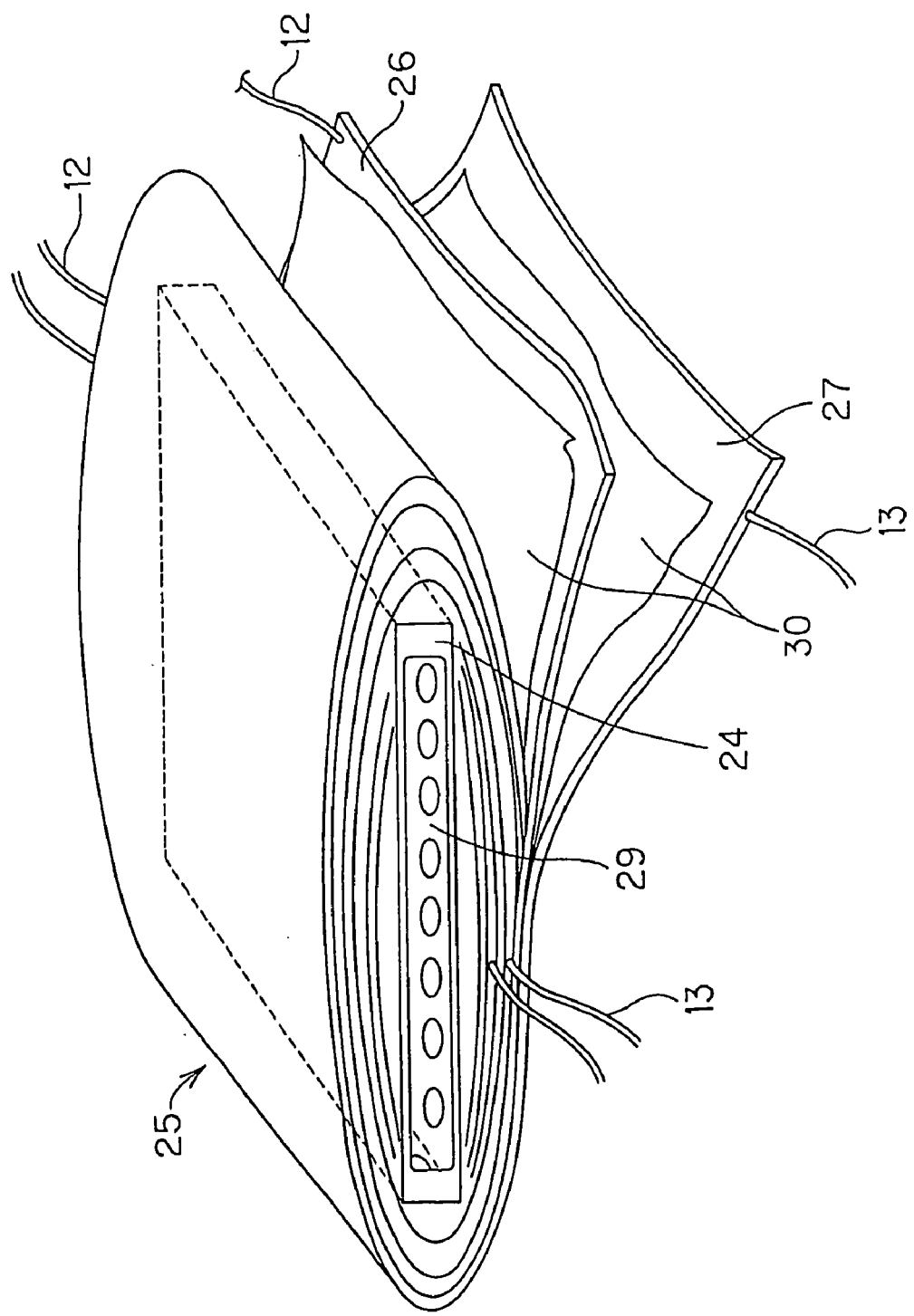
FIG. 5 A perspective view showing another example of the inner electrode member for use in the lithium secondary battery of the present invention.

FIG. 1 shows the lithium secondary battery 1 in which the shape of the core member 4 is cylindrical and whose whole shape is columnar. In addition, for example, as shown in FIG. 4, a core member 24 has a hollow plate shape, and a whole shape may be prismatic. In a case where the core member 24 shaped in this manner is used, as shown in FIG. 5, when an inner pressure rises to a predetermined pressure or more, portions close to through-holes 28 (see FIG. 4) of the core member 24 are broken to form holes in the metal foil materials constituting a cathode plate 26 and a anode plate 27, a gas release channel is formed to extend through the holes, the through-holes 28 (see FIG. 4) of the core member 24, and an inner space 29, and a gas can be released to the outside of the battery. Therefore, an effect similar to that of the lithium secondary battery 1 shown in FIG. 1 can be obtained. FIG. 4 is a perspective view showing another example of the core member for use in the lithium secondary battery of the present invention, and FIG. 5 is a perspective view showing another example of the inner electrode member for use in the lithium secondary battery of the present invention. It is to be noted that in FIG. 5, reference numeral 30 denotes a separator.

Figure 6:
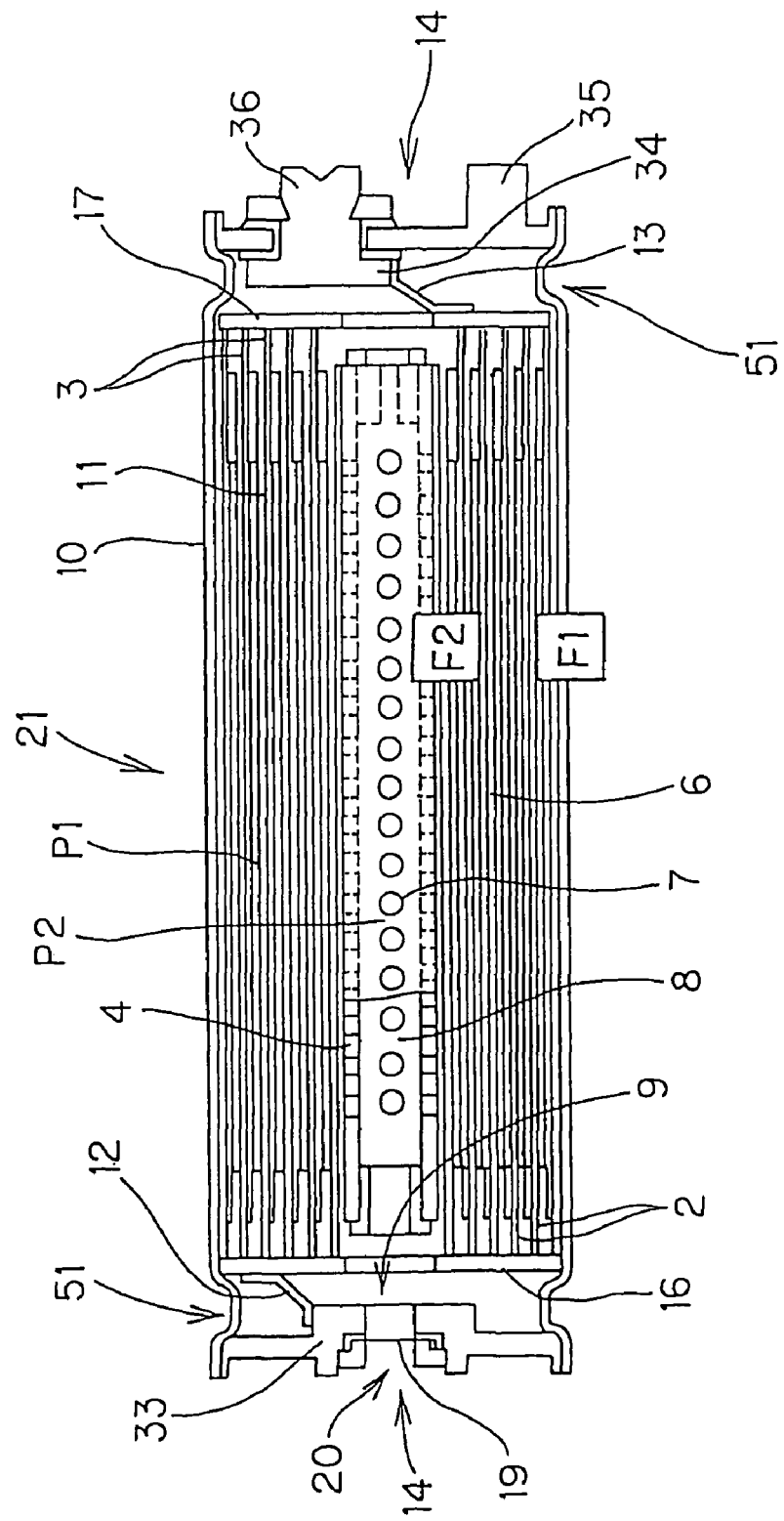
FIG. 6 A sectional view schematically showing another embodiment of the lithium secondary battery of the present invention.

FIG. 6 is a sectional view schematically showing another embodiment of the lithium secondary battery of the present invention. A lithium secondary battery 21 of the present embodiment shown in FIG. 6 comprises: an inner electrode member 6 having electrode plates (cathode plates 2, anode plates 3) including metal foil materials as constituting elements and constituted by winding the electrode plates around a core member 4 via separators 11; and a battery case 10 containing the inner electrode member 6. A cathode collector member 16 and an anode collector member 17 for deriving a current from the inner electrode member 6 are disposed. It is to be noted that the core member 4 is provided with at least one through-hole 7 which communicates with an inner space 8 of the core member 4. The lithium secondary battery 21 of the present embodiment is constituted in such a manner that a strength (F1) of the battery case 10 and a strength (F2) of a portion (i.e., the portion in which a hole is to be formed) close to the through-hole 7 of the metal foil material satisfy a relation F2<F1. The lithium secondary battery 21 of the present embodiment comprises a pressure release hole 9 as a pressure releasing mechanism, and the through-holes 7 formed in the core member 4 and the inner space 8 which communicates with the through-holes 7 communicate with this pressure release hole 9.

In the lithium secondary battery 21 of the present embodiment, when an inner pressure of a battery case 10 rises to a predetermined pressure or more, portions of the metal foil constituting the electrode plates (cathode plate 2, anode plate 3) close to the through-holes 7 of the core member 4 are broken to form holes. Here, since the lithium secondary battery 21 of the present embodiment is constituted in such a manner as to satisfy the relation of F2<F1, the holes are formed in a stage in which the battery case 10 is broken. Therefore, the gas release channel extending through the formed holes, the through-holes 7, and the inner space 8 is formed before the battery case 10 breaks, and the generated gas is guided into the pressure release hole 9. Therefore, the battery is remarkably superior in safety.

Figure 15:
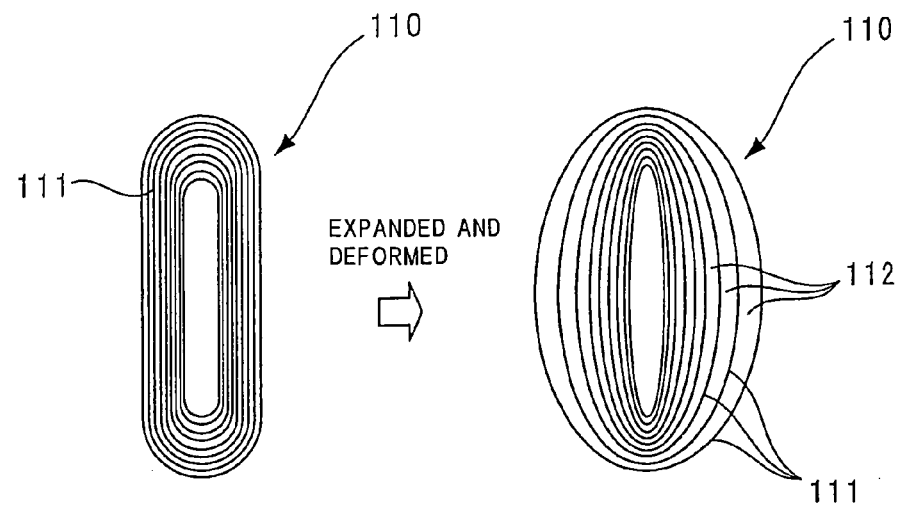
FIG. 15 A schematic diagram showing one example of a state in which the inner electrode member is expanded and deformed in a thickness direction of an electrode plate.

Moreover, the lithium secondary battery according to the present invention is preferably constituted in such a manner that, as shown in FIG. 15, when an inner pressure rises to a predetermined pressure or more, by a function of the raised inner pressure, an inner electrode member 110 is expanded and deformed in a thickness direction of electrode plates 111, space portions 112 are formed between the electrode plates 111 disposed adjacent to each other, and a gas release channel is formed that is capable of releasing a gas generated inside the inner electrode member to the outside of the battery case through the formed space portions 112. In this case, a main portion of the gas release channel is formed in parallel with a surface wound with (or laminated on) the electrode plate 111 between the adjacent electrode plates 111, and an effect similar to the lithium secondary battery 1 shown in FIG. 1 can be obtained.

Figure 16:
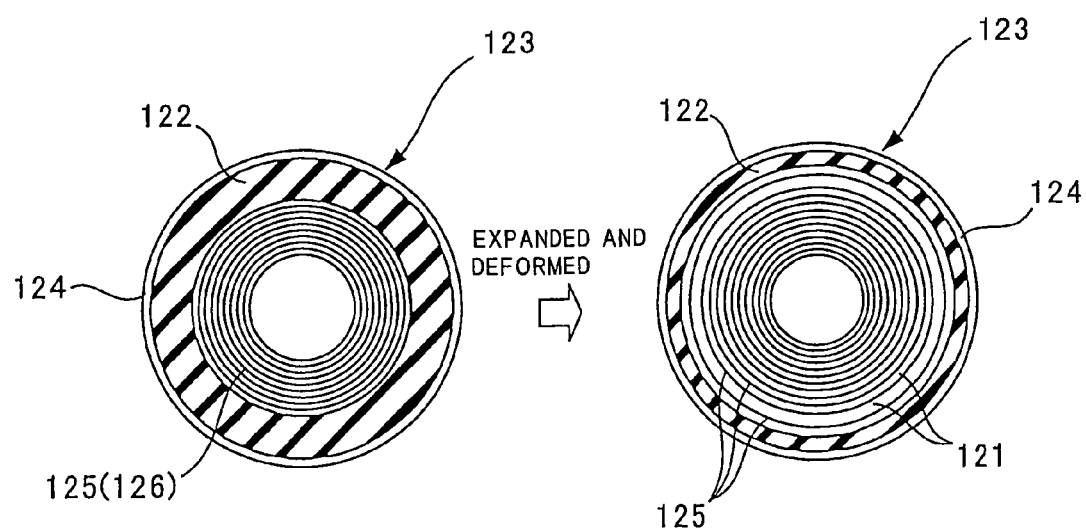
FIG. 16 A schematic diagram showing another embodiment of the state in which the inner electrode member is expanded and deformed in the thickness direction of the electrode plate.

Furthermore, as shown in FIG. 16, the lithium secondary battery according to the present invention further comprises a second exterior member 122 which is deformable at a predetermined pressure between an inner electrode member 126 and a battery case. The battery is preferably constituted in such a manner that in a case where an inner pressure rises to the predetermined or more pressure, by the function of the raised inner pressure, the second exterior member 122 is deformed, and the inner electrode member 126 is expanded and deformed in a thickness direction of an electrode plate 125. In a lithium secondary battery 123 of the present embodiment constituted in this manner, when the inner electrode member 126 is expanded and deformed, space portions 121 are formed between the electrode plates 125 disposed adjacent to each other, and a gas release channel is formed that is capable of releasing a gas generated inside the inner electrode member 126 to the outside of a battery case 124 through the formed space portions 121. Therefore, an effect similar to that of the lithium secondary battery 1 shown in FIG. 1 can be obtained.

It is to be noted that the "function of the inner pressure" includes a function of an inner temperature which rises with the rise of the inner pressure. Therefore, the second exterior member 122 softens by the temperature rise, or is sometimes molten and deformed. There is not any special restriction on a material constituting the second exterior member 122 as long as the material is deformed, softened, or molten at an appropriate pressure or temperature, and a thermoplastic resin material or the like can be preferably used.

Figure 7:
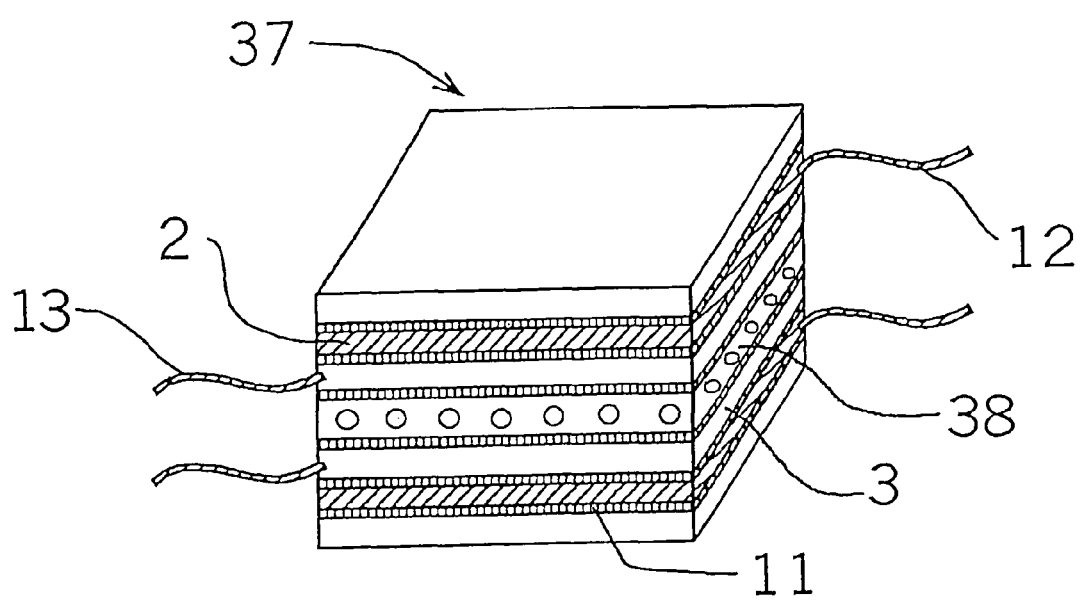
FIG. 7 A perspective view showing one example of a laminated inner electrode member for use in the lithium secondary battery of the present invention.
Figure 8:
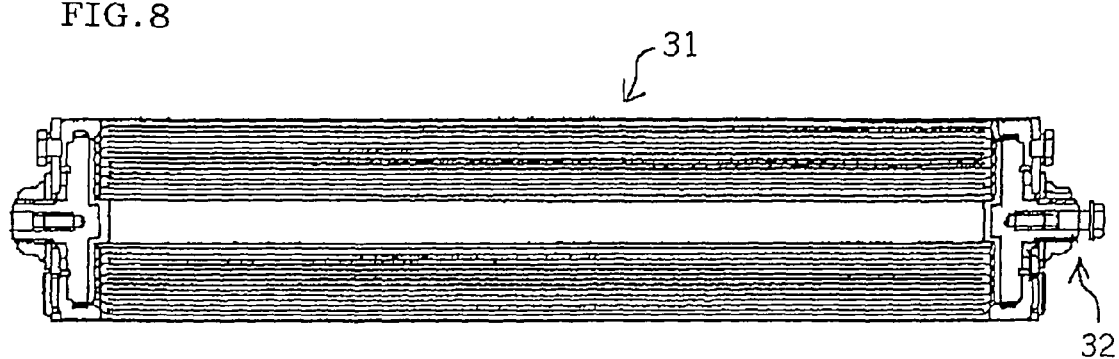
FIG. 8 A sectional view showing one embodiment of a conventional lithium secondary battery.
Figure 9A:
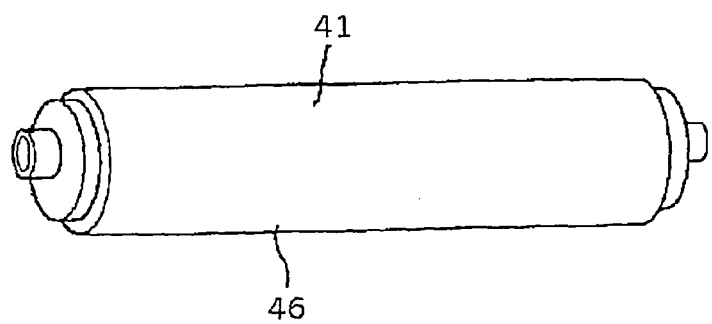
FIG. 9(a) is a perspective view.
Figure 9B:
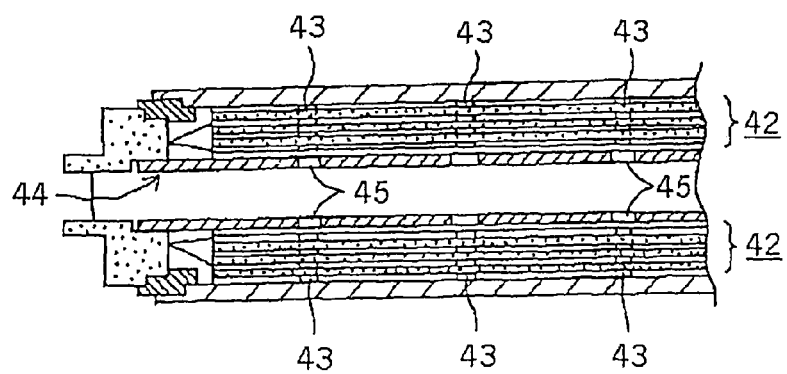
FIG. 9(b) is a partially sectional view.

The embodiments of the lithium secondary battery of the present invention have been described above in accordance with the example in which the wound type inner electrode member is mainly used, but, needless to say, the lithium secondary battery of the present invention is not limited to the above-described embodiments. There may be used, for example, a laminated type inner electrode member 37 comprising a core member 38 shown in FIG. 7. The lithium secondary battery according to the present invention is especially preferably adopted in a large-sized battery having a battery capacity of 2 Ah or more, but there is not any restriction on application to a battery having more capacity. The lithium secondary battery of the present invention is also preferable as a car-mounted battery of an electric vehicle (EV), a hybrid electric vehicle (HEV) or the like, or a motor driving power supply for an EV, HEV or the like by use of a characteristic that the battery has a large capacity at a reduced cost, and a high reliability, and is superior in long-term storage. Furthermore, the battery is also preferable as a power supply for starting an engine, for which a high output is required.

As described above, the lithium secondary battery of the present invention is constituted in such a manner that in a case where the inner pressure rises to the predetermined or more pressure by the gas generated inside the inner electrode member constituting the battery, the gas release channel is formed involving the deformation of the inner electrode member by the function of the raised inner pressure. Therefore, the substantial surface areas of the metal foil materials constituting the cathode plate and the anode plate are effectively utilized, the energy density is maintained to be high, and the battery has a remarkably superior safety.

EXAMPLE

The present invention will be described hereinafter in more detail in accordance with examples, but the present invention is not limited to the examples.

Example 1

To lithium manganese (Li was excessive, and a part of Mn was replaced with Ti in a composition represented by $LiMn_2O_4$) spinel used as a cathode active substance, 4% by mass of acetylene black in terms of an external ratio was added as an auxiliary conductive agent, and further a solvent and a binder were added to prepare a cathode slurry. Opposite surfaces of an aluminum foil having a thickness of 20 μm were coated with the slurry in such a manner as to achieve a thickness of about 50 μm, and a cathode plate having a thickness of about 120 μm was prepared.

On the other hand, opposite surfaces of a copper foil having a thickness of 10 μm were coated with an anode slurry prepared by use of graphite as an anode active substance in such a manner as to achieve a thickness of about 40 μm, and an anode plate having a thickness of about 90 μm was prepared.

The prepared cathode plate and anode plate were wound, via a separator (PP/PE/PP (three layers)), around a core member provided with at least one hole and constituted in such a manner that in a case where a pressure inside a lithium secondary batter rose to a predetermined pressure or more, a gas was released from a hole made by the broken cathode plate, anode plate or the like to thereby prepare a wound type inner electrode member. On the other hand, various types of organic solvents such as EC, DMC, and DEC were mixed at a volume ratio of 1:1:1 to prepare a mixed solvent, $LiPF_6$ as an electrolyte was dissolved in the solvent in such a manner as to obtain a concentration of 1 mol/l, and a nonaqueous electrolytic solution was prepared.

An aluminum-made cylindrical battery case in which the wound type inner electrode member was stored was charged with the nonaqueous electrolytic solution, and the battery case was sealed to thereby prepare a lithium secondary battery (provided with a pressure release valve) having a cell capacity of 5 Ah (Example 1). It is to be noted that the battery was prepared all by a dry process, and this eliminated an influence of a water content or the like that might enter from the outside of the battery owing to a sealing defect of the battery case.

Next, after the resultant lithium secondary battery (Example 1) was fully charged, an overcharging test was performed in which constant current charging (maximum voltage of a constant current power supply 200 A was set to 18 V) was continued.

Example 2

A lithium secondary battery Example 2 was manufactured by a method similar to that of Example 1 except that lithium nickel oxide (a part of Ni was replaced with Co and Al in a composition represented by $LiNiO_2$) spinel was used as a cathode active substance. Furthermore, an overcharging test was conducted in the same manner as in Example 1.

Comparative Example 1

A lithium secondary battery (Comparative Example 1) was manufactured by a method similar to that of Example 1 except that a conventional core member in which any hole was not formed was used as a core member to prepare a wound type inner electrode member. Furthermore, an overcharging test was conducted in the same manner as in Example 1.

Comparative Example 2

A lithium secondary battery (Comparative Example 2) was manufactured by a method similar to that of Example 2 except that a conventional core member in which any hole was not formed was used as a core member to prepare a wound type inner electrode member. Furthermore, an overcharging test was conducted in the same manner as in Example 1.

In the lithium secondary batteries of Examples 1 and 2, a metal foil material close to the core member was broken along the hole formed in the core member, and the pressure was released from this hole of the core member through a space in the core member owing to a rise of an inner pressure at an overcharging time. Therefore, the wound type inner electrode member wound with the metal foil material was not extremely broken, the battery case was not broken by the pressure rise, and the batteries were superior in safety.

On the other hand, in the lithium secondary battery of Comparative Example 1, at the overcharging time, the pressure release in the wound type inner electrode member did not catch up with the rise of the inner pressure, and the wound type inner electrode member was ruptured inside the battery case owing to the pressure rise. Furthermore, in the lithium secondary battery of Comparative Example 2, it was observed that the battery case was broken and ignited. This is supposedly because in the lithium secondary battery of Comparative Example 2, there was used lithium nickel oxide having a thermal stability lower than that of lithium manganese used in the lithium secondary battery of Comparative Example 1.

According to the above-described result, it has been found that superior safety can be secured even in a case where there is used, as the cathode active substance, lithium nickel oxide having a thermal stability lower that that of lithium manganese (i.e., reactivity is higher at an improper use test such as the overcharging test). It is to be noted that when the lithium secondary battery was manufactured by a method similar to that of Example 1 by use of lithium cobalt oxide ($LiCoO_2$) or a manganese cobalt nickel composite cathode material ($LiMn_{1/3}Co_{1/3}Ni_{1/3}O_2$) that has a thermal stability lower than that of lithium manganese oxide, in addition to the above-described cathode active substance. Moreover, the overcharging test was performed. In this case, a superior safety similar to that of the lithium secondary battery of Example 1 or 2 could be confirmed.

INDUSTRIAL APPLICABILITY

A lithium secondary battery of the present invention can be preferably used in a motor driving battery for an electric car or a hybrid electric car.

The invention claimed is:

1. A lithium secondary battery comprising:
an inner electrode member having wound or laminated electrode plates of a metal foil; and
a battery case for housing the inner electrode member,
wherein when an inner pressure of the battery case rises to a predetermined pressure or more by a gas generated inside the inner electrode member, predetermined portions of the metal foil break to form a gas release channel which allows the release of the gas to the outside of the battery case.

2. The lithium secondary battery according to claim 1, wherein at least a part of the gas release channel is formed inside the inner electrode member in a direction vertical to the surface of the inner electrode member onto which the electrode plate is wound or laminated.

3. The lithium secondary battery according to claim 1, wherein the inner electrode member further has a core member onto which the electrode plate is wound or laminated.

4. The lithium secondary battery according to claim 3, wherein the core member is shaped to have a predetermined inner space and one or more through-holes formed to communicate with the inner space, and
the metal foil in the vicinity of the through-hole is broken to form a hole, and
the gas release channel is formed which allows the release of the gas to the outside of the battery case through the hole, the through-hole, and the inner space by the function of the raised inner pressure in the case where the inner pressure rises to the predetermined or more pressure.

5. The lithium secondary battery according to claim 3, wherein the core member is provided with one or more groove portions which extend to at least one end portion of the core member, and
the metal foil in the vicinity of the groove portion is broken to form a hole, and
the gas release channel is formed which allows the release of the gas to the outside of the battery case through the hole and the groove portion by the function of the raised inner pressure in the case where the inner pressure rises to the predetermined or more pressure.

6. The lithium secondary battery according to claim 3, wherein the core member is provided with two or more core member elements having hollow portions and disposed in such a manner that gap portions having predetermined intervals are formed between the respective core member elements and the hollow portions communicate with each other, and
the metal foil in the vicinity of the gap portion is broken to form a hole, and
the gas release channel is formed which allows the release of the gas to the outside of the battery case through the hole, the gap portion, and the hollow portions by the function of the raised inner pressure in the case where the inner pressure rises to the predetermined or more pressure.

7. The lithium secondary battery according to claim 1, further comprising: a first exterior member which is disposed between the inner electrode member and the battery case and which has a predetermined inner space and which is provided with one or more through-holes which communicate with the inner space,
wherein the metal foil in the vicinity of the through-hole is broken to form a hole, and
the gas release channel is formed which allows the release of the gas to the outside of the battery case through the hole, the through-hole, and the inner space by the function of the raised inner pressure in the case where the inner pressure rises to the predetermined or more pressure.

8. The lithium secondary battery according to claim 1, wherein a strength (F1) of the battery case against pressure and a strength (F2) of the portion of the metal foil against pressure in which the hole is formed satisfy a relation of $F2<F1$.

9. A lithium secondary battery comprising:
an inner electrode member having wound or laminated electrode plates of a metal foil;
a battery case for housing the inner electrode member,
wherein when an inner pressure of the battery case rises to a predetermined pressure of more by a gas generated inside the inner electrode member, the inner electrode member is expanded and deformed in a thickness direction of the electrode plate, and a space portion is formed between the electrode plates disposed adjacent to each other creating a gas release channel which allows the release of the gas to the outside of the battery case through the space portion by the function of the raised inner pressure in the case where the inner pressure rises to the predetermined or more pressure.

10. The lithium secondary battery according to claim 9, further comprising: a second exterior member which is disposed between the inner electrode member and the battery case and which is deformable at a predetermined pressure, wherein the second exterior member is deformed, and the inner electrode member is expanded and deformed in a thickness direction of the electrode plate by a function of the raised inner pressure in the case where the inner pressure rises to the predetermined or more pressure.

11. The lithium secondary battery according to claim 1, wherein the battery case comprises a pressure releasing mechanism, and
an end of the gas release channel communicates with the pressure releasing mechanism.

12. The lithium secondary battery according to claim 1, wherein a shape of the core member is a pipe-shape, and a whole shape of the battery is cylindrical.

13. The lithium secondary battery according to claim 1, wherein a shape of the core member is a hollow plate-shape, and a whole shape of the battery is prismatic.

* * * * *

UNITED STATES PATENT AND TRADEMARK OFFICE
CERTIFICATE OF CORRECTION

| | | |
|---|---|---|
| PATENT NO. | : 7,998,608 B2 | |
| APPLICATION NO. | : 11/230282 | |
| DATED | : August 16, 2011 | |
| INVENTOR(S) | : Tsutomu Mori et al. | |

It is certified that error appears in the above-identified patent and that said Letters Patent is hereby corrected as shown below:

Title Page, Item (75), Inventors:

*please change* "Kenshin Kitou, Nagoya (JP)" to --Kenshin Kitoh, Nagoya (JP)--

Signed and Sealed this
Seventeenth Day of April, 2012

David J. Kappos
*Director of the United States Patent and Trademark Office*